US008500502B2

(12) United States Patent
Benedetti

(10) Patent No.: US 8,500,502 B2
(45) Date of Patent: Aug. 6, 2013

(54) FLOATING DEVICE FOR PIPES

(75) Inventor: Davide Benedetti, Massa (IT)

(73) Assignee: Valore Italia S.R.L., Rome (IT)

( * ) Notice: Subject to any disclaimer, the term of this patent is extended or adjusted under 35 U.S.C. 154(b) by 126 days.

(21) Appl. No.: 12/918,521

(22) PCT Filed: Feb. 18, 2009

(86) PCT No.: PCT/EP2009/001133
§ 371 (c)(1),
(2), (4) Date: Nov. 16, 2010

(87) PCT Pub. No.: WO2009/103498
PCT Pub. Date: Aug. 27, 2009

(65) Prior Publication Data
US 2011/0053444 A1    Mar. 3, 2011

(30) Foreign Application Priority Data

Feb. 20, 2008    (IT) .............................. MI2008A0269

(51) Int. Cl.
*B63B 22/00*      (2006.01)
(52) U.S. Cl.
USPC .......................................................... 441/133
(58) Field of Classification Search
USPC ................ 441/133, 136; 405/211, 212
See application file for complete search history.

(56) References Cited

U.S. PATENT DOCUMENTS

| 3,489,182 | A | | 1/1970 | Cameron |
| 4,382,919 | A | * | 5/1983 | Alonso et al. ................... 424/65 |
| 5,197,912 | A | | 3/1993 | Lengefeld |
| 7,771,245 | B2 | * | 8/2010 | Routeau et al. ............... 441/133 |

FOREIGN PATENT DOCUMENTS

| EP | 0 462 070 A1 | 12/1991 |
| FR | 2 701 070 A1 | 8/1994 |
| GB | 1 277 364 A | 6/1972 |
| GB | 1 554 114 A | 10/1979 |
| GB | 1 585 058 A | 2/1981 |
| GB | 2 379 681 A | 3/2003 |
| WO | 94/27073 A1 | 11/1994 |

OTHER PUBLICATIONS

International Search Report and Written Opinion of the ISA mailed Jun. 16, 2009 in corresponding International Application No. PCT/EP2009/001133.

* cited by examiner

*Primary Examiner* — Lars A Olson
(74) *Attorney, Agent, or Firm* — Duane Morris LLP

(57) ABSTRACT

A floating device (2, 102) for pipes (1) is described comprising at least two floating elements (3) each comprising a substantially semi-tubular body (4) and removably associable so as to define a pipe (1) housing seat (5), wherein the substantially semi-tubular body (4) of the floating elements (3) comprises at least a first protrusion (6) and at least a first slot (7) at a first longitudinal edge (8) thereof and at least a second protrusion (9) and at least a second slot (10) at a second opposite longitudinal edge (11) thereof; advantageously, the protrusions (6, 9) are substantially aligned with the slots (7, 10) at opposite parts with respect to a longitudinal centerline plane (TXL) of the floating element (3) so as to allow at least a partial interpenetration of the substantially semi-tubular bodies (4) of the floating elements (3).

77 Claims, 8 Drawing Sheets

FLOATING DEVICE FOR PIPES

FIELD OF THE INVENTION

The present invention relates to the field of floating devices used to maintain in a floating condition pipes or ducts for transporting solid, liquid or gaseous substances in the sea, rivers, lakes or other water basins.

More particularly, the present invention relates to a floating device for pipes comprising at least two floating elements each comprising a substantially semi-tubular body and removably associable so as to define a pipe housing seat.

The invention also relates to a floating element which may be used for realising a floating device for pipes, comprising a substantially semi-tubular body provided with at least one seat for housing a respective fixing device for removably associating the floating element to at least an additional floating element of the device.

PRIOR ART

In the field of transporting solid, liquid or gaseous substances in a sea, river or lake environment, the need often arises of ensuring that the pipes used for such a transport, generally made of synthetic or metallic materials, float on the free water surface so as to allow for example the movements of a dredge within a predetermined dredging area, so as to be easily recoverable and so as to be visible to any one sailing nearby.

In order to attain the desired floating effect of the pipes, the use of floating devices generally provided with a pair of floating elements having a substantially semi-tubular shape, or half-shells, removably coupled to each other so as to define a seat for housing the pipe, is known.

The half-shells can be structurally independent or made integral to each other, for example by hinging at a longitudinal edge thereof, and are removably coupled by means of one or more fixing devices, for example tie-rods or bolts.

Although the floating devices of this type are substantially meeting the purpose, they have the significant drawback of being unable to adapt themselves to different pipe diameters with the consequent need of having to purchase and keep on storage as many sizes of floating devices as the type of pipes used in the various transport applications, with the consequent high manufacturing costs and considerable use of space.

In order to at least partially overcome these drawbacks, it was proposed to provide the floating devices with special adapters to be inserted into the pipe housing seat defined between the floating elements and generally housed in respective housing seats formed in the inner wall of such elements.

Although this second type of floating devices allows to accomplish a partial adaptation to several different diameters of the pipe with a same size of the floating elements, such an adaptation is limited within a narrow adjustment range and is generally comprised in the range between 10 and 150 mm, so that the need of anyhow keeping on storage a certain number of floating elements of various sizes in the warehouse, clearly in addition to several sizes of adapters, is not entirely eliminated.

In addition, the use of these floating devices is more complicated and time-consuming since whenever the size of a pipe changes, more suitable adapters are to be mounted, optionally removing the adapters already installed for a different pipe size, before using the floating devices.

Since the adapters are installed on site, the adapters may be lost in the water hence extending the assembling times and increasing the costs.

SUMMARY OF THE INVENTION

The technical problem underlying the invention is that of overcoming at least in part the drawbacks illustrated above with respect to the cited prior art and, more particularly, that of providing a floating device for pipes capable of adapting itself, in a simple and quick manner and without using adapters, to a wider range of the pipe outer diameter, achieving at the same time an effective clamping action of pipe to be maintained in a floating condition.

According to a first aspect thereof, the invention therefore provides—in order to solve the aforementioned technical problem—a floating device of the aforementioned type which is characterised in that the substantially semi-tubular body of the floating elements comprises:

i) at least a first protrusion and at least a first slot at a first longitudinal edge thereof; and
ii) at least a second protrusion and at least a second slot at a second opposite longitudinal edge thereof;

and in that said protrusions are substantially aligned with said slots at opposite parts with respect to a longitudinal centreline plane of the floating element so as to allow at a least a partial interpenetration of the substantially semi-tubular bodies of the floating elements.

In the following description and in the subsequent claims, the terms: longitudinal, and: transversal, will be used to indicate structural and geometrical elements extending along a direction parallel to the longitudinal axis of the pipe housing seat and, respectively, along a direction perpendicular to the aforementioned axis in the use condition of the floating device and of the floating elements in which their outer semi-circumferential surface is laid on the free water surface.

Similarly, in the following description and in the subsequent claims, the terms: length, and: width, will be used to indicate geometrical entities measured along a longitudinal and along a transversal direction of the floating device and of the floating elements in the use condition thereof.

Lastly, in the following description and in the subsequent claims the terms: horizontal, and: vertical, will be used to indicate structural and geometrical elements of the floating device and of the floating elements oriented in this way in the use condition thereof.

According to the invention and thanks to the particular structure with protrusions and slots formed in the opposite longitudinal edges of the substantially semi-tubular body of the floating elements, it is advantageously possible to achieve the desired broadening of the adjustment range of the pipe housing seat to be maintained in a floating condition by simply moving the floating elements towards or away from each other and without the need of mounting any adapter within the aforementioned seat.

More particularly and as will be better apparent in the following, the structure of the substantially semi-tubular body of the floating elements allows to assemble the floating device of the invention according to two different configurations:

1) a first "anti-symmetric" mounting configuration of the floating elements with respect to a horizontal centreline plane passing through the geometric centre of the pipe housing seat defined between the floating elements, which configuration allows to adjust the transversal section of the aforementioned housing seat along a radial direction within a first adjustment range which allows to house a first series of pipes having an outer diameter falling within a first range of values, for example preferably comprised between 240 and 400 mm; and 2) a second "symmetric" mounting configuration of the floating elements with respect to the aforementioned horizontal centreline plane of the pipe housing seat, which configuration allows to adjust the transversal section of the aforementioned housing seat along a radial direction within a second adjustment range which allows to house a second series of pipes having an outer diameter falling within a second range of values, for example preferably comprised between 400 and 550 mm.

In a preferred embodiment, therefore, the adjustment range of the housing seat of the pipe to be maintained in a floating condition may be as high as 310 mm, that is, more than double of the adjustment range which may be attained by means of the adapters of the prior art.

Advantageously, the floating device of the invention allows to achieve the aforementioned first adjustment range of the transversal section of the pipe housing seat thanks to at least a partial interpenetration of the substantially semi-tubular bodies of the floating elements which thus define a housing seat defined by the intersection of the inner walls of the floating elements.

According to a first preferred embodiment, the inner walls of the floating elements have a substantially semicircular transversal section so that the pipe housing seat has a substantially elliptical transversal section.

According to a second preferred embodiment, the inner walls of the floating elements comprise a plurality of curvilinear portions having a suitable curvature radius connected by flat surfaces extending at opposite parts of the longitudinal centreline plane of the floating elements, so that the pipe housing seat has a transversal section differing from that of the previous embodiment due to the presence of flat connecting surfaces between curvilinear portions.

Advantageously and as will be better apparent in the following, these flat connecting surfaces define as many contact and clamping surfaces of the pipe adapted to securely hold in place the latter within the housing seat.

Advantageously, the floating device of the invention also allows to achieve the aforementioned second adjustment range of the transversal section of the pipe housing seat starting from a condition of abutting cooperation along the vertical direction between the protrusions of the substantially semi-tubular body of the floating elements, condition in which the floating elements define a pipe housing seat still having a transversal section similar to that of the first adjustment range, up to a spaced-apart condition between the aforementioned protrusions wherein the floating elements define a substantially circular or slightly oval-shaped pipe housing seat along the vertical direction, with possible curvilinear portions extending along the vertical direction at the longitudinal centreline plane of the floating element.

Advantageously, the floating device of the invention effectively holds the pipe in place in both the aforementioned mounting configurations of the floating elements and in both the aforementioned embodiments of the inner walls of the floating elements thanks to the presence of a plurality of contact surfaces between the pipe and the inner walls of the floating elements and thanks to the presence of the protrusions extending from the longitudinal edges of the substantially semi-tubular body of the floating elements, which protrusions serve as abutment elements adapted to prevent unwanted lateral movements of the pipe in all the adjustment conditions.

Preferred features of the floating device according to the invention are defined in the attached dependent claims 2-25 the content of which is herein integrally incorporated by reference.

According to a second aspect thereof, the invention further provides—in order to solve the aforementioned technical problem—a floating element for a floating device for pipes, comprising a substantially semi-tubular body provided with at least one seat for housing a respective fixing device for removably associating the floating element to at least an additional floating element of said device, which is characterised in that said substantially semi-tubular body comprises:

i) at least a first protrusion and at least a first slot at a first longitudinal edge thereof; and ii) at least a second protrusion and at least a second slot at a second opposite longitudinal edge thereof;

wherein said protrusions are substantially aligned to said slots at opposite parts with respect to a longitudinal centreline plane of the floating element.

Advantageously, the aforementioned floating element has structural and functional features adapted to allow the realisation of the floating device for pipes of the invention achieving both the advantageous technical effects outlined above and the additional advantageous technical effects which will be illustrated hereinafter.

Preferred features of the floating element according to the invention are defined in the attached dependent claims 27-47 the content of which is herein integrally incorporated by reference.

BRIEF DESCRIPTION OF THE FIGURES

Additional features and advantages of the present invention will be better apparent from the following detailed description of some preferred embodiments of a floating device and of a floating element according to the invention, provided hereinbelow for illustrating and non-limiting purposes with reference to the attached drawings. In the drawings.

DETAILED DESCRIPTION OF THE PREFERRED EMBODIMENTS

Figure 1:
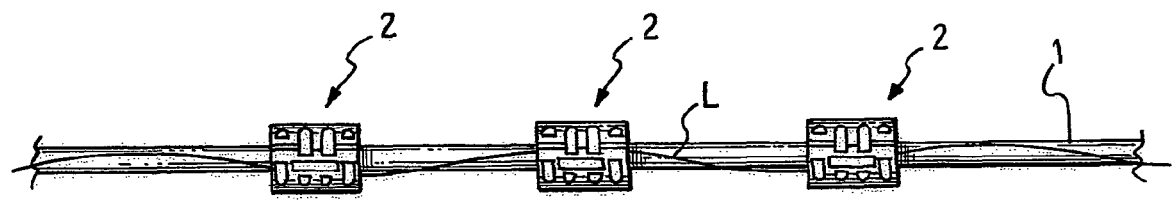
FIG. 1 is a schematic view of a pipe for transporting solid, liquid or gaseous substances, for example for transporting solid material in dredging operations, kept in a floating condition in free waters by means of a plurality of floating devices according to the invention.

With reference to FIG. 1, a pipe for transporting solid substances, for example a flexible pipe made of plastic material for transporting a suspension or "slurry" of solid dredge material drained onshore, maintained in a floating condition in water, for example in the sea the free surface of which is indicated at L in FIG. 1, by means of a plurality of floating devices 2 according to the invention, is generally indicated at 1.

In a first preferred embodiment of the floating device 2 illustrated in FIGS. 2-10, each floating device 2 comprises a pair of floating elements 3, structurally identical to each other, each comprising a substantially semi-tubular body, indicated at 4.

The floating elements 3 are removably associable to each other so as to define a seat 5 for housing the pipe 1 whose transversal section can be advantageously radially adjusted in a very easy manner, as will be described in more detail hereinafter, so as to be capable of housing pipes having an outer diameter comprised in a range of values for example preferably comprised between 240 and 550 mm (adjustment range of the seat 5 equal to 310 mm).

To this end and according to the invention, the substantially semi-tubular body 4 of the floating elements 3 comprises at least a first protrusion 6 and at least a first slot 7 formed at a first longitudinal edge 8 thereof and at least a second protrusion 9 and at least a second slot 10 formed at a second opposite longitudinal edge 11 thereof with respect to a longitudinal centreline plane $\pi_L$ of the floating element 3.

In order to radially adjust the transversal section of the seat 5, furthermore, the protrusions 6 and 9 are substantially aligned with the slots 7, 10 at opposite parts with respect to the aforementioned longitudinal centreline plane $\pi_L$ so as to allow at least a partial interpenetration of the substantially semi-tubular bodies 4 of the floating elements 3.

In a particularly preferred embodiment and as illustrated in the figures, the substantially semi-tubular body 4 of the floating elements 3 comprises one protrusion 6 and two slots 7 at the longitudinal edge 8 and two protrusions 9 and one slot 10 at the opposite longitudinal edge 11.

In this way, it is advantageously possible to achieve an effective holding action of the pipe 1 within the seat 5 thanks to the presence of the protrusions 6 and 9 which act as abutment elements adapted to prevent unwanted lateral movements of the pipe 1.

Within the framework of this preferred embodiment, the slots 7 are preferably formed in the longitudinal edge 8 at longitudinally opposite parts of the protrusion 6, while the protrusions 9 are preferably extending from the opposite longitudinal edge 11 at longitudinally opposite parts of the slot 10.

In the preferred embodiments illustrated, furthermore, the floating elements 3 have an advantageous symmetric configuration with respect to a transversal centreline plane $\pi_T$ thereof (see FIG. 5), so that the floating device 2 achieves the aforementioned preferred and advantageous adjustment characteristics of the transversal section of the housing seat 5 of the pipe 1 and modularity characteristics in the most varied mounting configurations of the floating elements 3.

In the preferred embodiments illustrated, therefore, the protrusion 6 and the slot 10 aligned thereto with respect to the longitudinal centreline plane $\pi_L$ of the floating elements 3 are provided astride and symmetrically with respect to the transversal centreline plane $\pi_T$, while the protrusions 9 and the slots 7 are formed at longitudinally opposite parts of the slot 10 and, respectively, of the protrusion 6 in a symmetric manner with respect to the transversal centreline $\pi_T$.

The geometric configuration thus obtained advantageously allows, as will be better apparent in the following, to link the floating elements 3 to each other so as to form a floating device, indicated at 102 in FIG. 16, having a modular structure capable of achieving an adjustable buoyancy depending upon the number of floating elements 3.

In the preferred embodiments illustrated, the protrusion 6 extending from the longitudinal edge 8 of the body 4 preferably has a length substantially equal to twice the length of each of the two slots 7 preferably formed in the aforementioned edge at longitudinally opposite parts of the protrusion 6.

In an entirely similar manner, the slot 10 formed in the opposite longitudinal edge 11 of the body 4 preferably has a length substantially equal to twice the length of each of the two protrusions 9 extending from the aforementioned edge at longitudinally opposite parts of the slot 10.

Preferably, furthermore, the protrusion 6 extending from the longitudinal edge 8 has substantially the same length of the slot 10 formed in the opposite longitudinal edge 11 and aligned thereto with respect to the longitudinal centreline plane $\pi_L$; while the protrusions 9 extending from the longitudinal edge 11 have substantially the same length of the slots 7 formed in the opposite longitudinal edge 8 and aligned thereto with respect to the aforementioned longitudinal centreline plane $\pi_L$.

Figure 16:
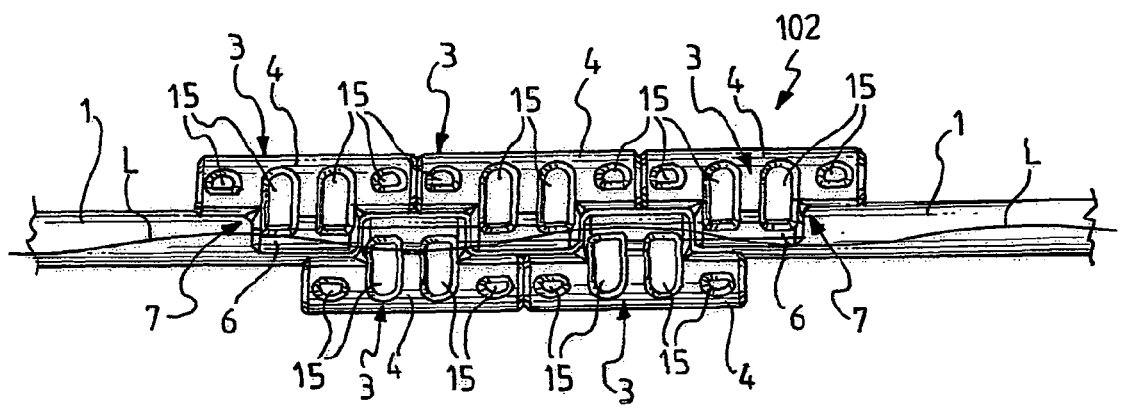
FIG. 16 is a schematic view of a pipe for, transporting solid, liquid or gaseous substances kept in a floating condition in free waters by means of a plurality of floating devices according to the preferred embodiments of the invention.

Thanks to the aforementioned features, it is advantageously possible to link the floating elements 3 to each other in an accurate manner and without excessive clearances, so as to obtain as illustrated in FIG. 16 a floating device 102 comprising more than two floating elements 3 and having a rigid and compact modular structure thanks to an effective abutment with a minimum clearance along the longitudinal direction between the protrusions 6, 9 of the floating elements 3.

Preferably, the protrusions 6, 9 and the slots 7, 10 define respective horizontal end surfaces 6a, 9a, 7a and 10a substantially coplanar with each other.

Figure 9:
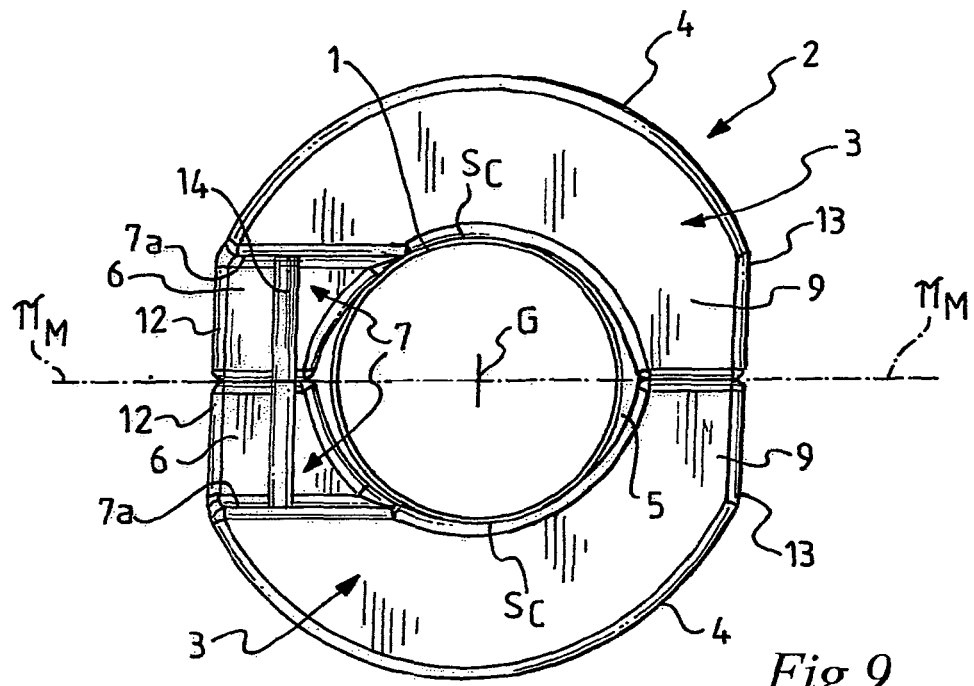
FIG. 9 is a front view of the floating device of FIG. 2 in a first adjustment condition of the "symmetric" mounting configuration of the floating elements.

Advantageously, these horizontal end surfaces 6a, 9a, 7a and 10a define respective substantially coplanar abutment surfaces which contribute to increase the coupling stability between a plurality of floating elements 3 both in the configuration in which the protrusions 6, 9 are entirely housed within the slots 7, 10 and are in contact with the end surfaces 7a and 10a thereof (see FIG. 7) and, respectively, in the configuration in which the protrusions 6 and 9 are in abutment against each other at their end surfaces 6a and 9a (see FIG. 9).

In the preferred embodiments illustrated, the protrusions 6, 9 are housed in a shape-mating manner within the slots 7, 10 so as to increase the stability of the connection between a plurality of floating elements 3 in their various coupling configurations illustrated for exemplifying purposes in FIGS. 2 and 7-10.

In the preferred embodiments illustrated, furthermore, the protrusions 6, 9 and the slots 7, 10 have a width substantially equal to the width of the opposite longitudinal edges 8, 11 of the substantially semi-tubular bodies 4 in which they are formed.

In this way, it is advantageously possible to facilitate the mutual interpenetration of the substantially semi-tubular bodies 4 of the floating elements 3 achieving the aforementioned desired adjustment of the transversal section of the housing seat 5 of the pipe 1 along the radial direction.

In the preferred embodiment illustrated, the substantially semi-tubular body 4 of the floating elements 3 has a circumferential development lower than the circumferential development of a semi-tubular element having the same inner diameter. In other words, the body 4 of the floating elements 3 is not exactly semi-tubular, but the opposite longitudinal edges 8, 11 thereof lie at a plane $\pi_B$ parallel to the horizontal plane $\pi_C$ passing through the geometrical centre C of the aforementioned semi-tubular element having the same inner diameter (see FIG. 6).

Figure 7:
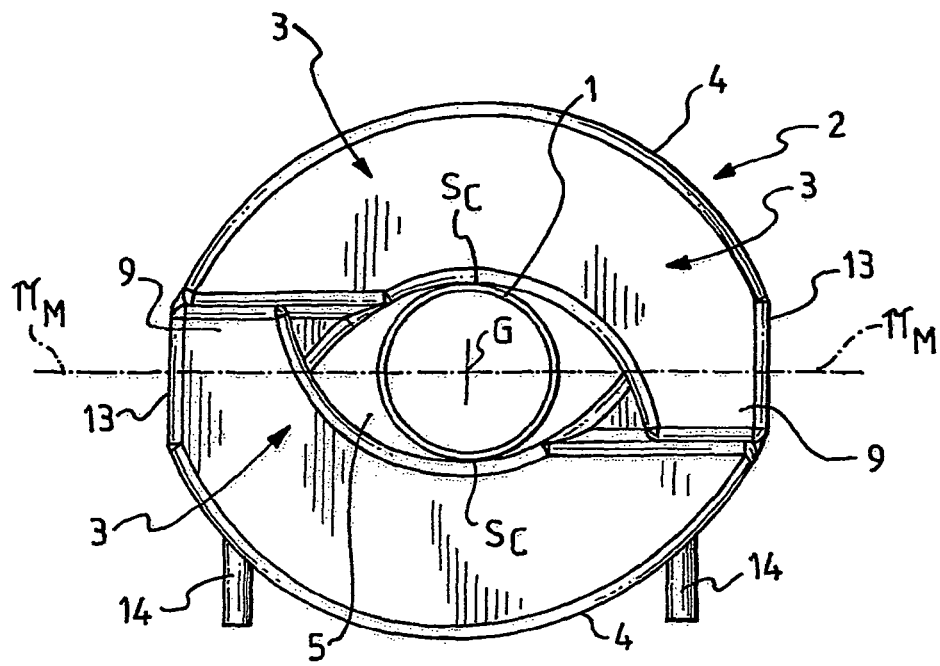
FIG. 7 is a front view of the floating device of FIG. 2 in a first adjustment condition of the "anti-symmetric" mounting configuration of the floating elements.

In this way, it is advantageously possible to increase the degree of mutual interpenetration between the substantially semi-tubular bodies 4 of the floating elements 3, as illustrated for example in FIG. 7, increasing the adjustment range of the transversal section of the housing seat 5 of the pipe 1 along the radial direction until the aforementioned preferred values are attained.

This advantageous technical effect, furthermore, may be achieved along with an advantageous reduction of the volume of the floating elements 3 with a consequent reduction both of the overall size of the latter and of the raw material used for their manufacture.

Preferably, the distance d between the aforementioned horizontal planes $\pi_B$ and $\pi_C$ is comprised between 70 and 110 mm so as to optimise the aforementioned advantageous technical effects.

In this preferred embodiment, furthermore, the inner wall 4a of the body 4 of the floating elements 3 defines a curvilinear surface having a curvature radius R equal to the radius of the semi-tubular element having the same inner diameter which is in turn preferably equal to the radius of the pipe of maximum diameter that can be housed within the seat 5 of the floating device 2 or 102 in the configuration of maximum distance between the bodies 4 of the floating elements 3 and, thus, in the configuration of maximum radial extension of the seat 5.

Thus, for example, if the pipe 1 of maximum diameter which may be housed within the seat 5 has—as mentioned above—a diameter of 550 mm, the value of the curvature radius R is equal to 275 mm.

In the first preferred embodiment illustrated in FIGS. 2-10, the body 4 of the floating elements 3 is provided with a substantially planar outer face 12, still more preferably with two substantially planar outer faces 12, 13, extending at the protrusions 6 and 9.

In this way, it is advantageously possible to further reduce the overall size of the floating device 2 along the transversal direction avoiding the presence of projecting parts also in the configuration of maximum interference between the floating elements 3 illustrated in FIG. 7.

The presence of the aforementioned planar faces 12, 13 further allows to arrange side-by-side or to stack in an easier manner the floating elements 3 while on storage facilitating the storing operations and reducing the space occupied.

In order to attain the desired removable coupling between the floating elements 3, the floating device 2 further comprises at least one fixing device 14, preferably a plurality of fixing devices conventional per se, such as for example bolts, tie-rods, ratchet systems or other suitable fixing devices easily selectable by those skilled in the art.

In a preferred embodiment, the size of the substantially tubular bodies 4 of the floating elements 3 is advantageously such that the free end of the fixing devices 14 does not project out of the outer profile of the floating elements 3 even in the configuration of maximum interference between the latter as illustrated in FIG. 7.

The floating elements 3 are preferably provided with at least one seat, preferably with a plurality of seats all indicated at 15 and suitably shaped, externally formed at opposite parts of the bodies 4 in substantial alignment with the opposite longitudinal edges 8, 11 of the bodies 4 and adapted to house the fixing devices 14.

In a way conventional per se, each of the seats 15 comprises a through hole 16 formed in the substantially semi-tubular body 4 of the floating elements 3 and extending along the vertical direction so as to allow the passage of the fixing devices 14 constituted, in this preferred embodiment, by bolts.

In the preferred embodiment illustrated, the seats 15 and the respective through holes 16 formed in the body 4 of the floating elements 3 are spaced pitchwise from each other and preferably according to a constant pitch equal to the ratio between the total length of the floating elements 3 and the number of the seats 15 and thus of the holes 16.

Figure 2:
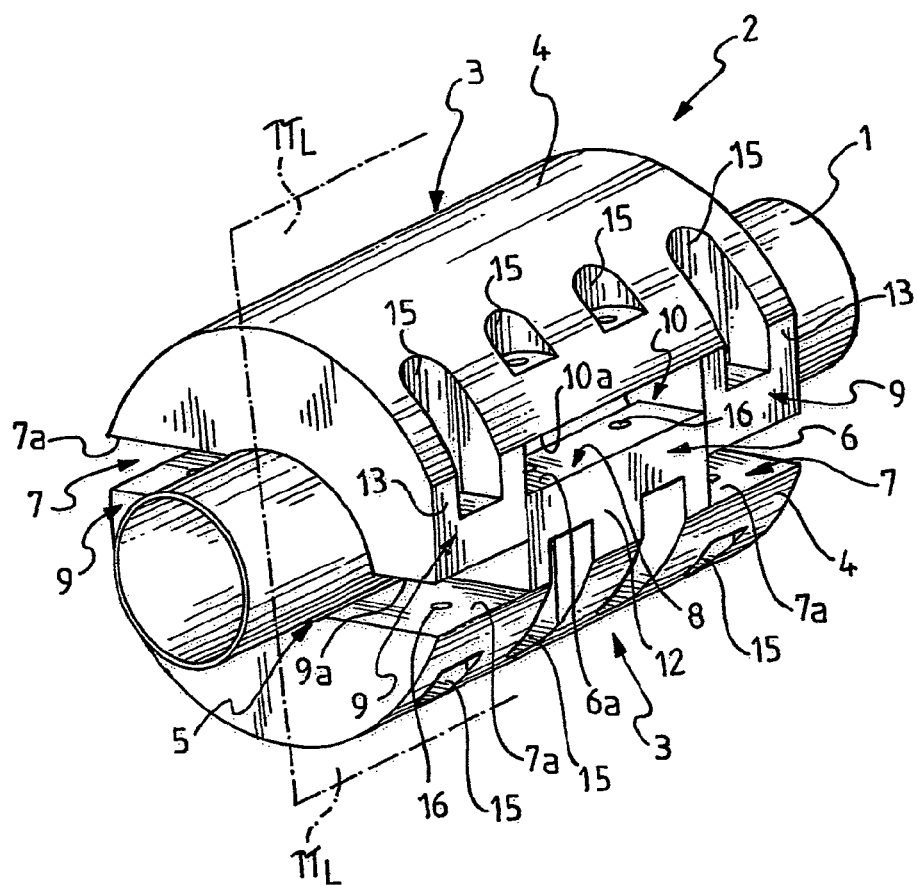
FIG. 2 is an axonometric view of some details of a floating device according to a first preferred embodiment of the invention and of a portion of the pipe kept in a floating condition by such a device.
Figure 3:
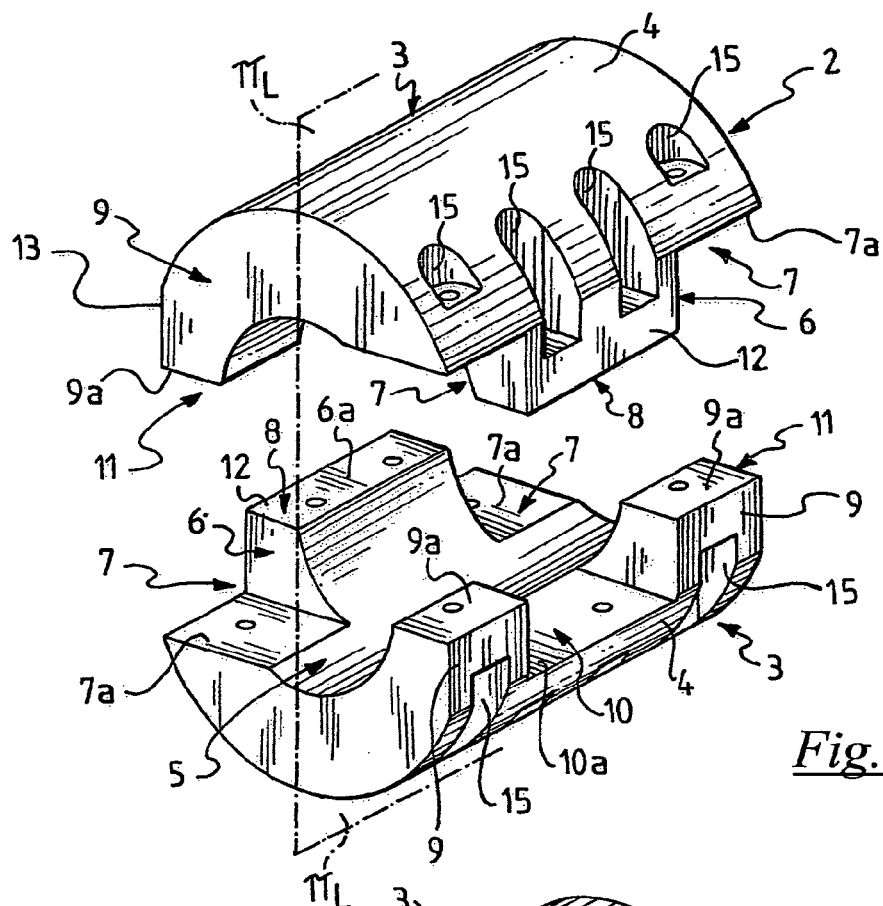
FIG. 3 is an exploded axonometric view of the floating device of FIG. 2 in a first mounting configuration of the floating elements.
Figure 4:
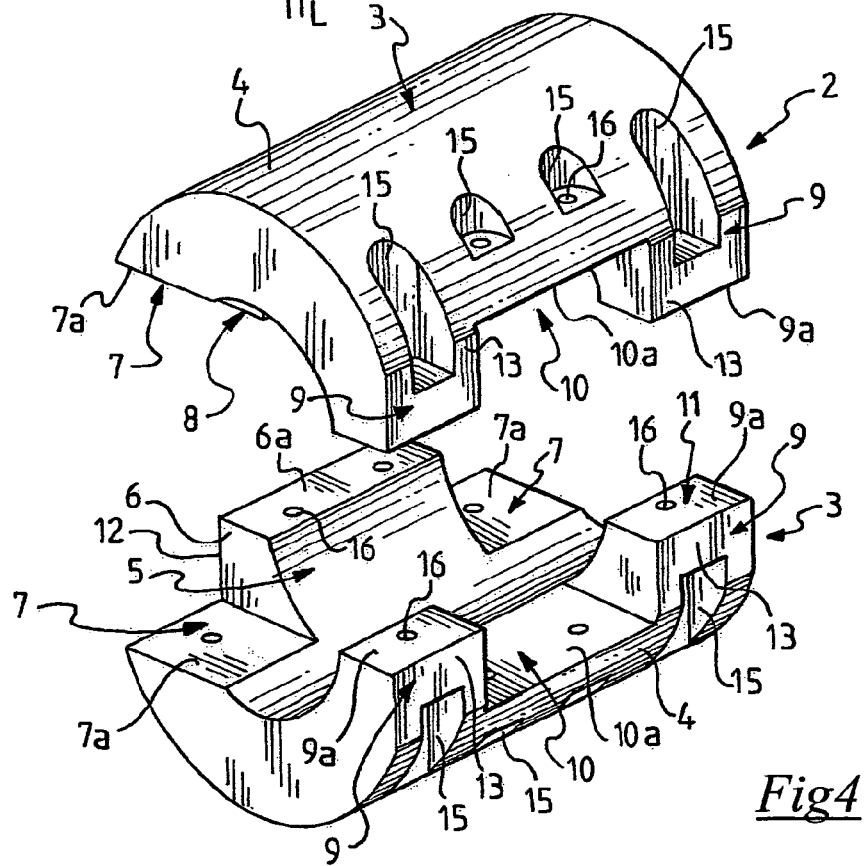
FIG. 4 is an exploded axonometric view of the floating device of FIG. 2 in a second mounting configuration of the floating elements.
Figure 5:
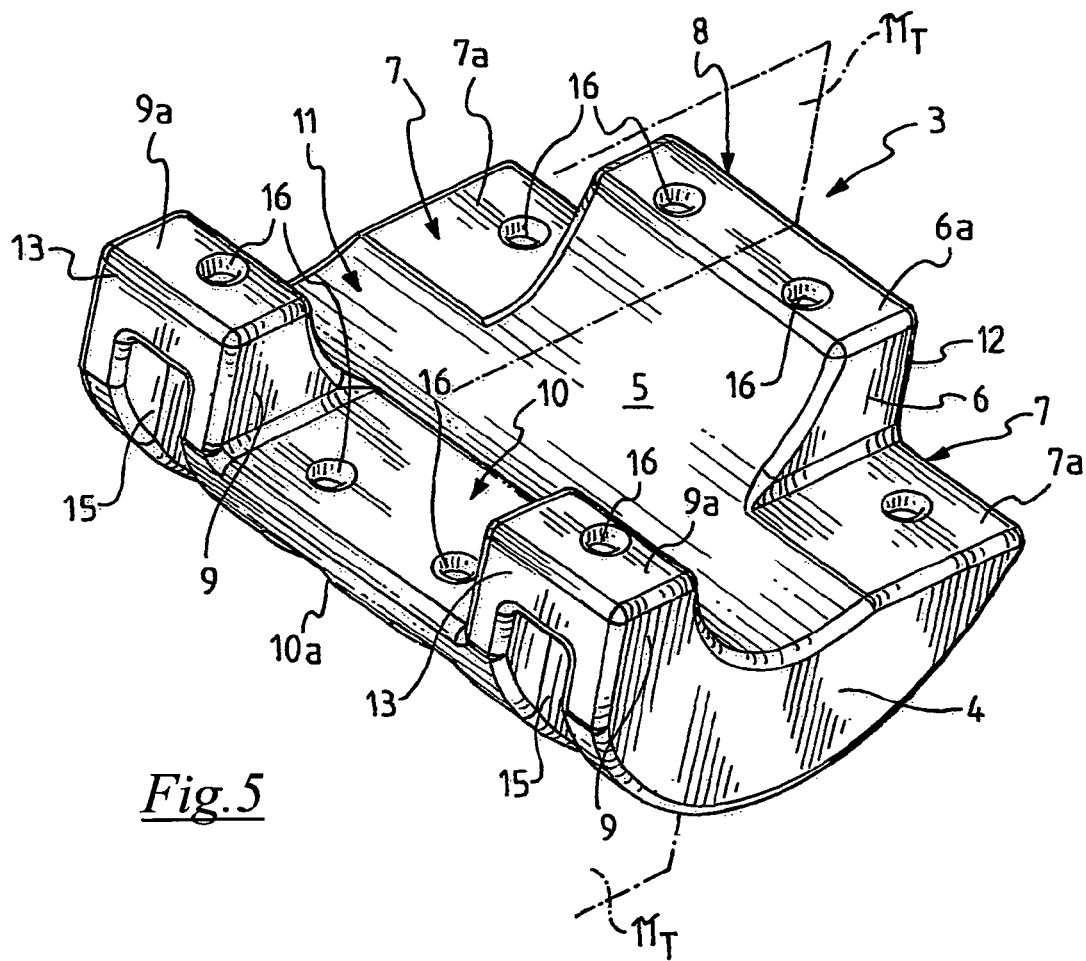
FIG. 5 is an axonometric view of a floating element of the floating device of FIG. 2.
Figure 6:
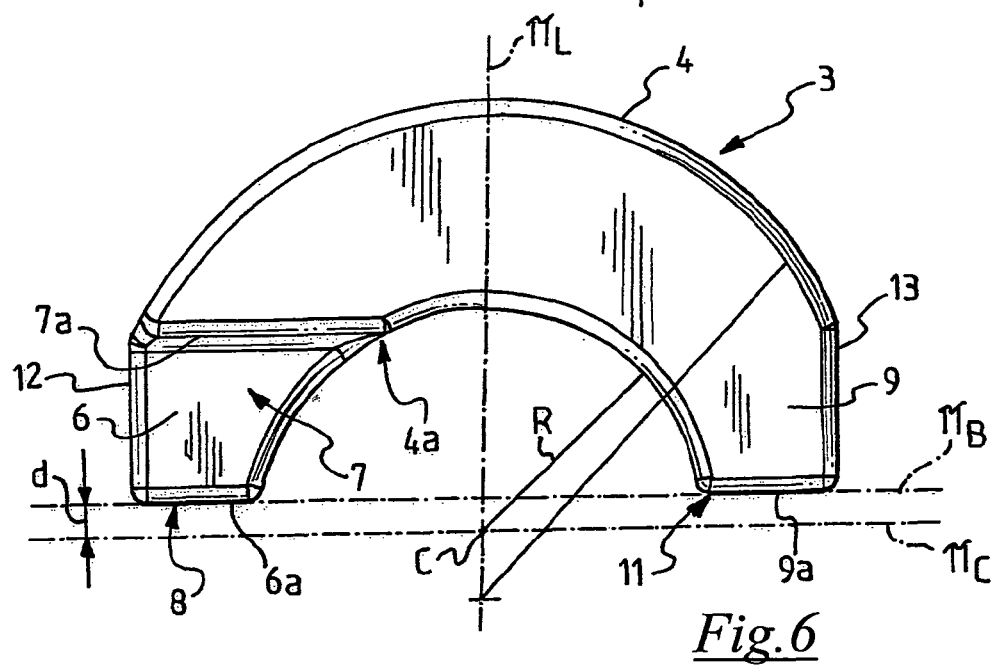
FIG. 6 is a front view of the floating element of FIG. 5.

In this way, it is advantageously possible both to connect two floating elements 3 to each other to form a floating device 2 with two diametrically opposite elements, such as for example illustrated in FIG. 2, and to connect three or more floating elements 3 to each other to provide the modular floating device 102 with linked floating elements having a greater length, such as for example illustrated in FIG. 16.

Thanks to the aforementioned pitch characteristic between the seats 15, the holes 16 are in fact aligned allowing the insertion of the fixing devices 14 substantially in all the modular assembly configurations of the floating elements 3.

In the preferred embodiments illustrated, the body 4 of the floating elements 3 is internally hollow so as to achieve the desired buoyancy characteristics for example preferably comprised between 32 and 430 kg of net buoyancy, intended as the capacity to maintain in a floating condition sections of pipes at full load.

Within the framework of this preferred embodiment and in order to adjust the buoyancy, the body 4 of the floating elements 3 may optionally be filled with foamed material such as for example polyurethane foam or other foamed materials easily selectable by those skilled in the art.

Preferably, the body 4 of the floating elements 3 is made of a suitable plastic material, such as for example polyethylene, polypropylene, PVC, polyamide or other plastic materials easily selectable by those skilled in the art, and it is preferably manufactured by means of suitable moulding techniques, such as for example injection blow moulding.

In this preferred embodiment, the floating device 2 therefore achieves the desired buoyancy characteristics even though it has a very low weight and cost.

Within the framework of the preferred embodiment in which the substantially semi-tubular body 4 of the floating elements 3 is hollow, the body 4 is preferably provided with a plurality of stiffening ribs, located inside the body 4 and—as such—not shown in the drawings, adapted to advantageously enhance the strength characteristics of the floating elements 3.

Preferably, the aforementioned stiffening ribs are formed in the body 4 of the floating elements 3 at the housing seats 15 of the fixing devices 14 and, more particularly, are advantageously obtained without any further operations thanks to the shaping operation of the body 4 required to form the seats 15 themselves.

In use, the floating device 2 described above is generally assembled in situ by coupling at least two floating elements 3 in a removable manner using the fixing devices 14 (in this case constituted by bolts) so as to define the housing seat 5 of the pipe 1 between the substantially semi-tubular bodies 4 of the floating elements 3 as shown, for example, in FIGS. 1 and 2. Depending upon the overall weight of the pipe 1 and thus on the buoyancy characteristics required to be attained for maintaining the pipe floating, a number of floating devices 2 comprising two floating elements 3 or, alternatively, a number of floating devices 102 comprising three or more floating elements 3 sufficient to attain the buoyancy required, is thus mounted along the pipe as shown, for example, in FIGS. 1 and 16.

According to the invention and thanks to the particular structure of the substantially semi-tubular body 4 of the floating elements 3, provided with the protrusions 6, 9 and with the slots 7, 10, the floating devices 2, 102 described above achieve the desired enhancement of the radial adjustment range of the transversal section of the housing seat 5 of the pipe 1 to be maintained in a floating condition by simply moving the floating elements 3 towards or away from each other without the need of mounting any reducer or adapter within the seat 5.

Figure 10:
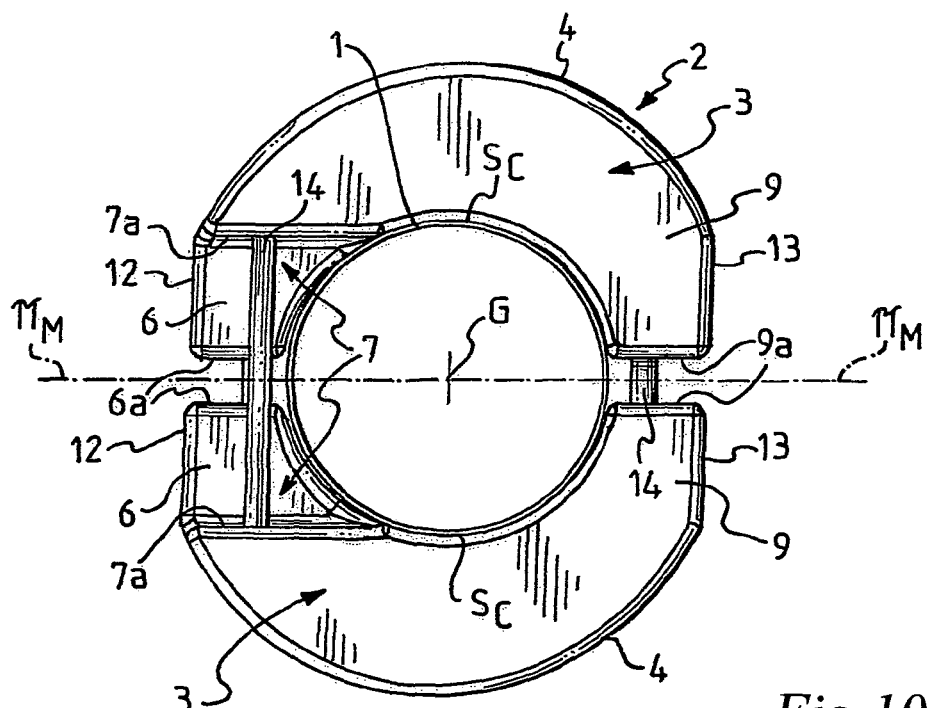
FIG. 10 is a front view of the floating device of FIG. 2 in a second adjustment condition of the "symmetric" mounting configuration of the floating elements.

More particularly and as is better illustrated in FIGS. 7-10, the structure of the body 4 of the floating elements 3 allows to assemble the floating devices 2, 102 of the invention according to two different configurations:

1) a first "anti-symmetric" mounting configuration of the floating elements 3 with respect to the horizontal centreline plane $\pi_M$ passing through the geometrical centre G of the housing seat 5 of the pipe 1 defined between the floating elements 3, which configuration allows to adjust along the radial direction the transversal section of the seat 5 within a first adjustment range which allows to house a first series of pipes 1 having an outer diameter falling within a first range of values, for example comprised between 240 and 400 mm (see FIGS. 7 and 8); and 2) a second "symmetric" mounting configuration of the floating elements 3 with respect to the aforementioned horizontal centreline plane $\pi_M$ of the housing seat 5 of the pipe 1, which configuration allows to adjust along the radial direction the transversal section of the aforementioned housing seat 5 within a second adjustment range which allows to house a second series of pipes 1 having an outer diameter falling within a second range of values, for example comprised between 400 and 550 mm (see FIGS. 9 and 10).

Figure 8:
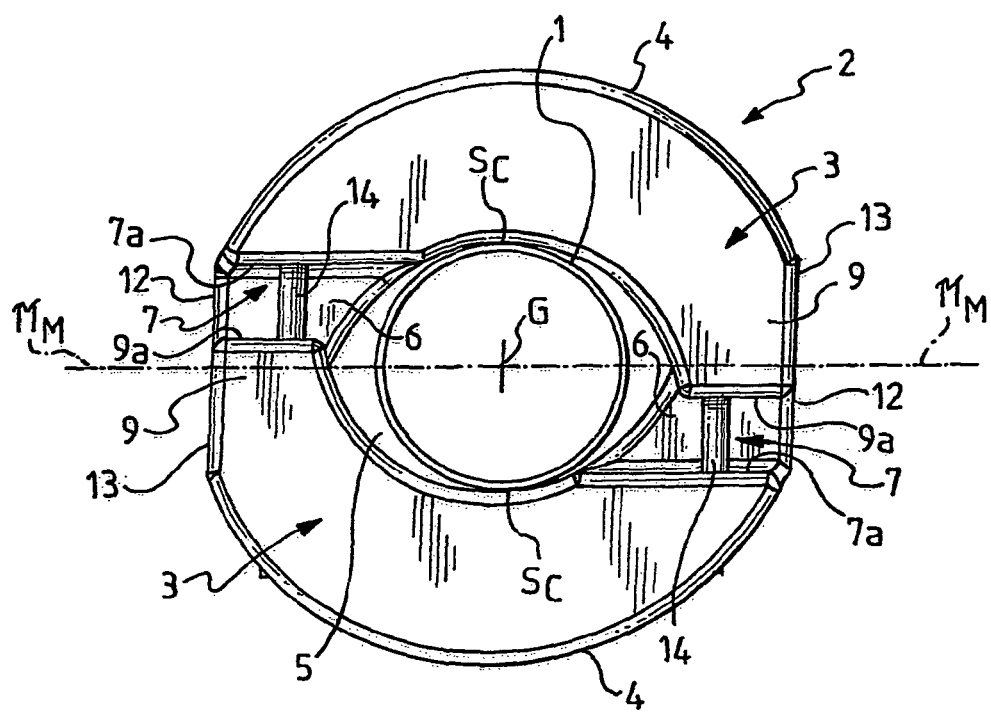
FIG. 8 is a front view of the floating device of FIG. 2 in a second adjustment condition of the "anti-symmetric" mounting configuration of the floating elements.

As graphically shown in FIGS. 7 and 8, the floating devices 2, 102 of the invention advantageously allow to obtain the aforementioned first adjustment range of the transversal section of the housing seat 5 of the pipe 1 thanks to a partial interpenetration of the bodies 4 of the floating elements 3 which define in this way a housing seat 5 having a substantially elliptical transversal section defined by the intersection of the substantially semi-cylindrical inner walls 4a of the body 4 of the floating elements 3.

As graphically shown in FIGS. 9 and 10, the floating devices 2, 102 of the invention also allow to obtain the aforementioned second adjustment range of the transversal section of the housing seat 5 of the pipe 1 starting from a condition of abutting cooperation along the vertical direction between the protrusions 6, 9 of the body 4 of the floating elements 3, wherein the latter define a seat 5 still having a substantially elliptical transversal section (FIG. 9), up to a spaced-apart condition between the aforementioned protrusions wherein the floating elements 3 define a substantially circular pipe housing seat (FIG. 10).

Advantageously, the floating devices 2, 102 of the invention effectively hold the pipe 1 in position in both the aforementioned mounting configurations of the floating elements 3 thanks to the presence of the protrusions 6, 9 extending from the longitudinal edges 8, 11 of the body 4 of the floating elements 3, which protrusions serve as abutment elements adapted to prevent unwanted lateral movements of the pipe 1 in all the adjustment conditions.

In the various intermediate configurations of radial adjustment of the seat 5, furthermore, the inner walls 4a of the body 4 define in the floating device 2 at least two longitudinally extending diametrically opposite curvilinear abutment surfaces Sc (two longitudinal contact lines, in an ideal case of a perfect non-deformability of the pipe 1 and of the body 4), arranged astride the longitudinal centreline plane $\pi_L$ of the floating elements 3 and adapted to effectively hold the pipe 1 in position.

A second preferred embodiment of the floating device 2 and of the floating elements 3 according to the invention will now be described with reference to FIGS. 11-15.

In the following description and in such figures, the elements of the floating device structurally or functionally equivalent to those illustrated above with reference to FIGS. 1-10 will be indicated with the same reference numerals and will not be further described.

Figure 11:
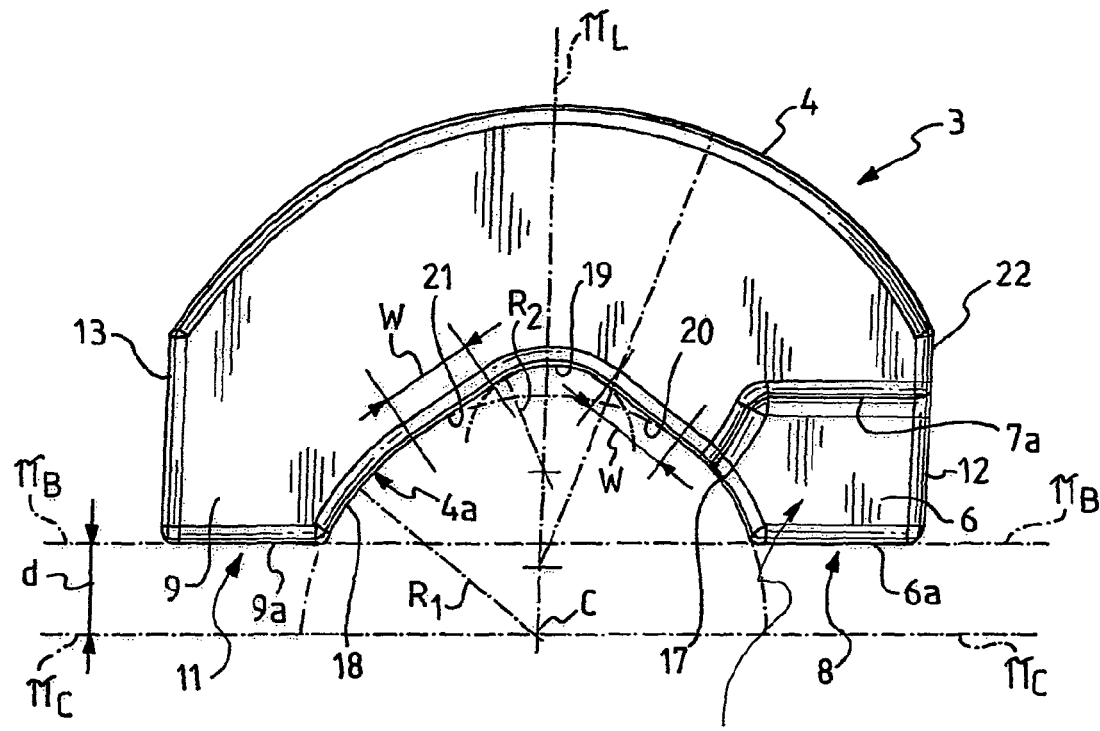
FIG. 11 is a front view of a floating element of a second preferred embodiment of the floating device of the invention.

In this second preferred embodiment and as illustrated in FIG. 11, the substantially semi-tubular body 4 of the floating elements 3 is provided with an inner wall 4a formed by a plurality of curvilinear surfaces having a suitable curvature radius connected by flat surfaces extending at opposite parts of the longitudinal centreline plane $\pi_L$ of the floating elements 3.

More particularly, the inner wall 4a of the body 4 preferably comprises:

two curvilinear surfaces 17, 18 having a first curvature radius R1 and extending at opposite parts of the longitudinal centreline plane $\pi_L$ of the floating elements 3;

a curvilinear surface 19 having a second curvature radius R2 lower than the first curvature radius R1 and extending astride the longitudinal centreline plane $\pi_L$ of the floating elements 3;

two flat connecting surfaces 20, 21 between the aforementioned curvilinear surfaces 17, 18 and the curvilinear surface 19 and extending at opposite parts of the longitudinal centreline plane $\pi_L$ of the floating elements 3.

In this way and as will be better apparent in the following, it is advantageously possible to further enhance the clamping action of the pipe 1 by the floating device 2 increasing the surfaces or lines of contact with the pipe 1 in each configuration of radial adjustment of the seat 5.

Preferably, the curvature radius R1 of the curvilinear surfaces 17, 18 is equal to the radius of the pipe 1 of maximum diameter that can be housed within the seat 5 of the floating device 2 or 102 in the configuration of maximum distance between the bodies 4 of the floating elements 3 and, hence, of maximum radial extension of the seat 5.

Figure 15:
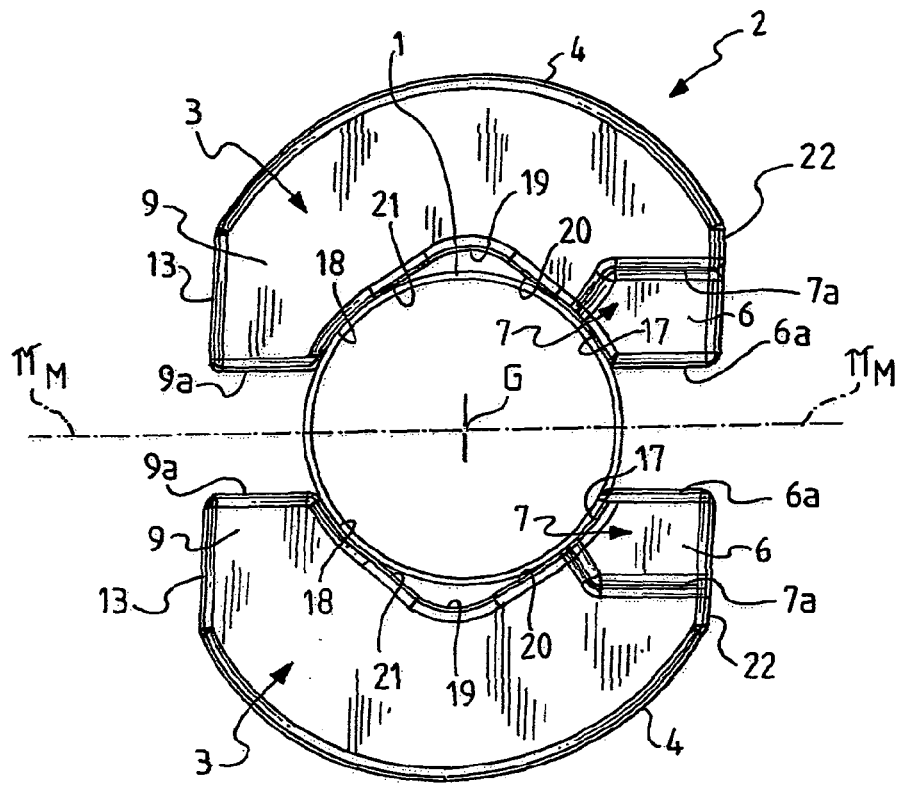
FIG. 15 is a front view of the floating device of FIG. 12 in a second adjustment condition of the "symmetric" mounting configuration of the floating elements.

In this way and as is better illustrated in FIG. 15, it is advantageously possible to increase the contact surface with the pipe 1 and, hence, the clamping action of the latter in the most critical configuration of the floating device 2 from the structural point of view, that is, in the configuration of maximum distance between the bodies 4.

Thus, for example, if the pipe 1 of maximum diameter which may be housed within the seat 5 has a diameter of 550 mm as indicated above, the value of the curvature radius R1 is equal to 275 mm.

Preferably, the curvature radius R2 of the curvilinear surface 19 is equal to the radius of the pipe 1 of minimum diameter which may be housed within the seat 5 of the floating device 2 or 102 in the configuration of maximum interpenetration between the bodies 4 of the floating elements 3 and, thus, of minimum radial extension of the seat 5.

Figure 12:
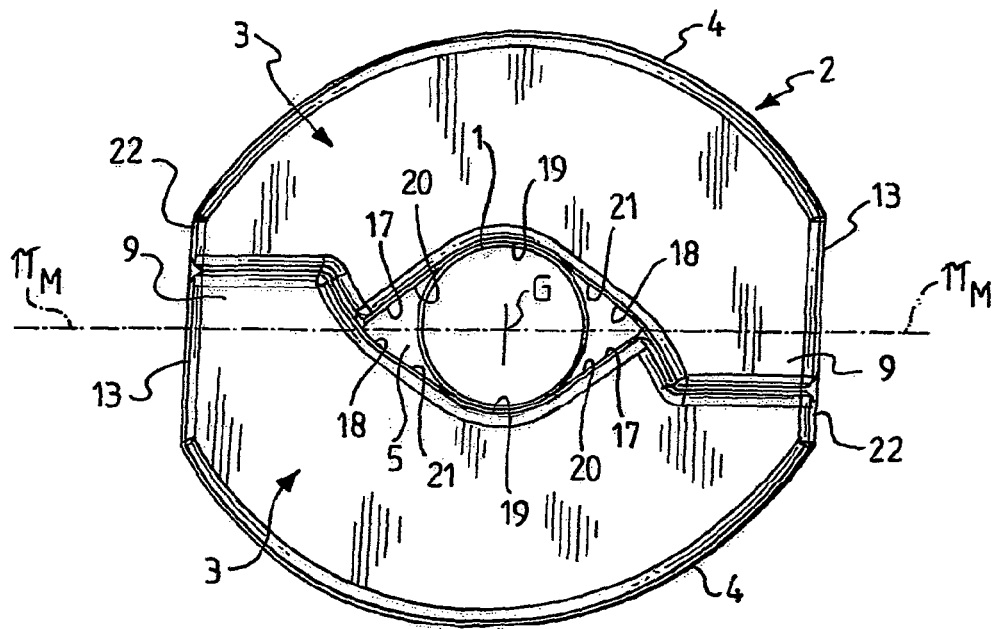
FIG. 12 is a front view of a floating device including at least two floating elements of FIG. 11 in a first adjustment condition of the "anti-symmetric" mounting configuration of the floating elements.

In this way and as illustrated in FIG. 12, it is advantageously possible to further increase the contact surface with the pipe 1 and, hence, the clamping action of the latter in the configuration of maximum interpenetration between the bodies 4.

Thus, for example, if the pipe of minimum diameter which may be housed within the seat 5 has a diameter of 240 mm as described above, the value of the curvature radius R2 is equal to 120 mm.

Also in this preferred embodiment, the distance d between the horizontal planes $\pi_B$ passing through the longitudinal edges 8, 11 of the body 4 and $\pi_C$ passing through the geometrical centre C of the semi-tubular element having an inner diameter equal to the maximum diameter of the pipe 1 which can be housed within the seat 5 (see FIG. 11) is preferably comprised between 70 and 110 mm so as to optimise the previously illustrated advantageous technical effects of increasing the degree of mutual interpenetration between the bodies 4 of the floating elements 3, as illustrated for example in FIG. 12, and of reducing the volume of the floating elements 3 with a consequent reduction of both the overall size of the latter and of the raw material used for their manufacture.

Preferably, the flat connecting surfaces 20, 21 have the same width w preferably comprised between 105 and 110 mm.

Figure 13:
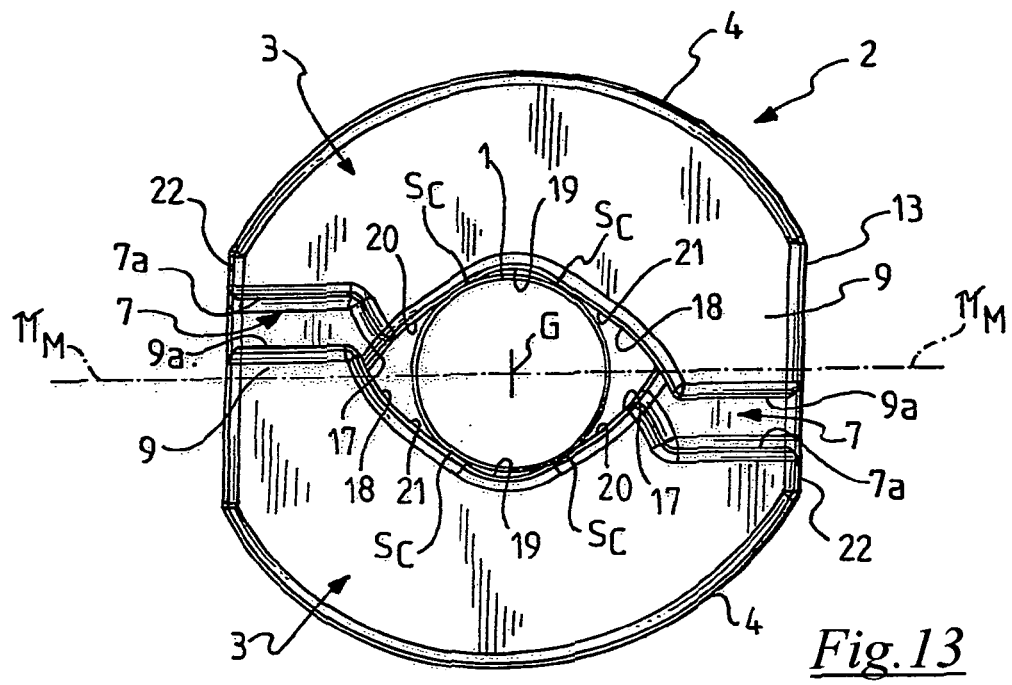
FIG. 13 is a front view of the floating device of FIG. 12 in a second adjustment condition of the "anti-symmetric" mounting configuration of the floating elements.
Figure 14:
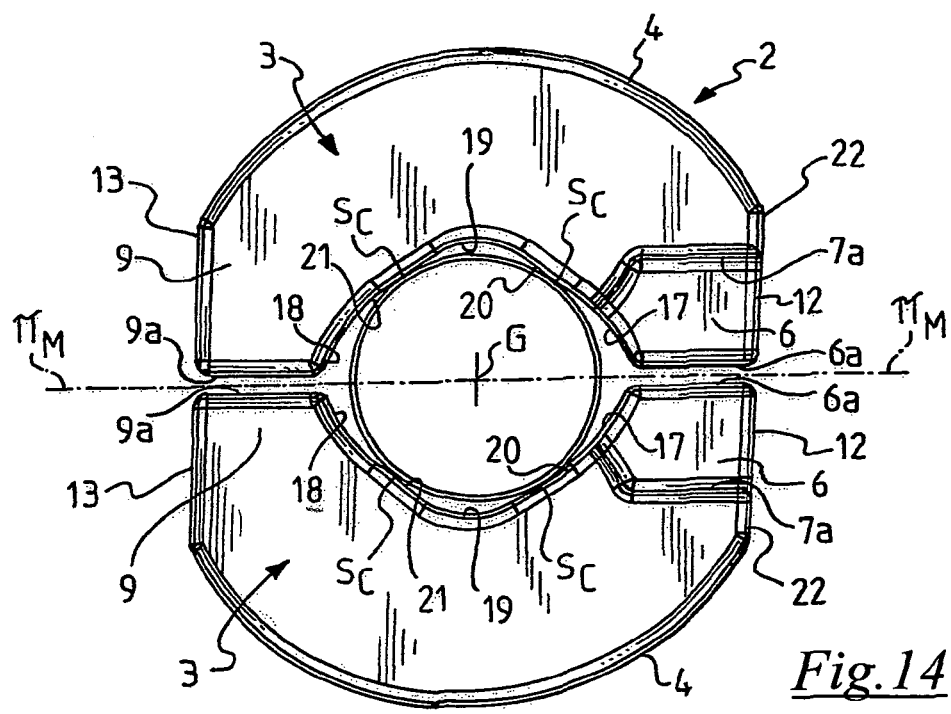
FIG. 14 is a front view of the floating device of FIG. 12 in a first adjustment condition of the "symmetric" mounting configuration of the floating elements.

In this way and as is better illustrated in FIGS. 13 and 14, it is advantageously possible to further increase the contact surface with the pipe 1 and, thus, the clamping action of the latter in the intermediate configurations of radial adjustment of the seat 5 between the configuration of maximum interpenetration between the bodies 4 illustrated in FIG. 12 and the configuration of maximum distance between the bodies 4 illustrated in FIG. 15.

In all these intermediate configurations of radial adjustment of the seat 5, in fact, the flat connecting surfaces 20, 21 define in the floating device 2 at least four rectilinear longitudinal abutment surfaces Sc (four rectilinear longitudinal contact lines, in an ideal case of perfect non-deformability of the pipes 1 and of the body 4), arranged at opposite parts of the longitudinal centreline plane $\pi_L$ of the floating elements 3 and adapted to effectively hold the pipe 1 in place.

The structure of the body 4 of the floating elements 3 of this second preferred embodiment, therefore allows, as illustrated in FIGS. 12-15, to assemble the floating devices 2, 102 of the invention according to the two "anti-symmetric" and "symmetric" mounting configurations of the floating elements 3 described above achieving the same technical effects along with a further improvement of the clamping action of the pipe 1 due to the different configuration of the inner wall 4a of the body 4.

In this second preferred embodiment and as it may be seen in FIGS. 11-15, the substantially semi-tubular body 4 of the floating elements 3 is provided with additional substantially planar outer faces 22 extending at the slots 7 and 10.

In this way, it is advantageously possible both to further reduce the overall size along the transversal direction of the floating device 2 avoiding the presence of projecting parts also in the configuration of maximum interference between the floating elements 3 illustrated in FIG. 12, and to arrange side-by-side or to stack in an even easier manner the floating elements 3 while on storage facilitating the storing operations and reducing the space occupied.

According to the invention and as it may be inferred from what has been illustrated above, it is thus possible to realise with only one size of the floating element 3—which may be manufactured by moulding plastic material at a large scale and low cost—floating devices 2, 102 capable to maintain in a floating condition a series of pipes 1 having an outer diameter falling within a rather wide range of values, up to a point that with only two sizes of the floating element 3 it is possible to realise floating devices 2, 102 capable to maintain in a floating condition substantially all the pipes 1 available on the market.

The geometrical configuration of the floating element 3 also allows an advantageous reduction both of the overall size of the floating devices 2, 102 in use, and of the overall size of the floating elements 3 during transport and storage thereof.

Thanks to the provision of a plurality of seats 15 for housing a corresponding plurality of fixing devices 14 in the body 4 of the floating elements 3, it is also advantageously possible to achieve an effective clamping action of the pipe 1 within the seat 5, which clamping action can be further increased as outlined above thanks to the presence of the protrusions 6, 9.

Lastly, thanks to the aforementioned characteristics of geometry and symmetry of the floating elements 3, it is advantageously possible to realise modular floating devices 102 with a plurality of elements, as illustrated for example in FIG. 16, having the desired length and adjustable at will depending upon the buoyancy which is to be achieved.

Clearly, a man skilled in the art may introduce modifications and variants to the invention described hereinbefore in order to meet specific and contingent application requirements, variants and modifications which anyway fall within the scope of protection as defined in the attached claims.

The invention claimed is:

1. Floating device for pipes comprising at least two floating elements each comprising a substantially semi-tubular body provided with an inner wall, said floating elements being removably associable so as to define a pipe housing seat,
   wherein the substantially semi-tubular body of the floating elements comprises:
   (i) at least a first protrusion and at least a first slot at a first longitudinal edge thereof; and
   (ii) at least a second protrusion and at least a second slot at a second opposite longitudinal edge thereof; and
   wherein said protrusions are substantially aligned with said slots at opposite parts with respect to a longitudinal centreline plane of the floating element so as to allow at least a partial interpenetration of the substantially semi-tubular bodies of the floating elements, such that said seat is defined by an intersection of the inner walls of the substantially semi-tubular bodies of the floating elements.

2. Floating device according to claim 1, wherein the substantially semi-tubular body of the floating elements comprises:
(i) one protrusion and two slots at said first longitudinal edge thereof; and
(ii) two protrusions and one slot at said second longitudinal edge thereof.

3. Floating device according to claim 2, wherein the slots formed at said first longitudinal edge are formed at longitudinally opposite parts of said protrusion and wherein the protrusions formed at said second longitudinal edge are extending at longitudinally opposite parts of said slot.

4. Floating device according to claim 2, wherein the protrusion extending from the first longitudinal edge of the substantially semi-tubular body has a length which is substantially twice the length of each of the two slots formed in said first edge and wherein the slot formed in the opposite longitudinal edge of said body has a length which is substantially twice the length of each of the two protrusions extending from said second edge.

5. Floating device according to claim 1, wherein said floating elements have a symmetric configuration with respect to a transversal centreline plane thereof.

6. Floating device according to claim 1, wherein said at least a first protrusion has substantially the same length of said at least a second slot and wherein said at least a second protrusion has substantially the same length of said at least a first slot.

7. Floating device according to claim 1, wherein said protrusions and said slots define respective end surfaces substantially coplanar with each other.

8. Floating device according to claim 1, wherein said protrusions are housed in a shape-mating manner within said slots.

9. Floating device according to claim 1, wherein said protrusions and said slots have a width substantially equal to the width of the opposite longitudinal edges of said substantially semi-tubular bodies.

10. Floating device according to claim 1, wherein the substantially semi-tubular body of the floating elements has a circumferential development lower than the circumferential development of a semi-tubular element having the same inner diameter.

11. Floating device according to claim 1, wherein the inner wall of the substantially semi-tubular body of at least one of the floating elements defines a curvilinear surface having a curvature radius equal to the radius of the pipe of maximum diameter that can be housed within the seat defined between the floating elements.

12. Floating device according to claim 1, wherein the inner wall of the substantially semi-tubular body of at least one of the floating elements is formed by a plurality of curvilinear surfaces having a predetermined curvature radius connected by flat surfaces extending at opposite parts of said longitudinal centreline plane of the floating element.

13. Floating device according to claim 12, wherein said inner wall of the body comprises:
two curvilinear surfaces having a first curvature radius and extending at opposite parts of the longitudinal centreline plane of said at least one floating element;
a third curvilinear surface having a second curvature radius lower than the first curvature radius and extending astride the longitudinal centreline plane of said at least one floating element; and
two flat connecting surfaces between said curvilinear surfaces and said third curvilinear surface, said flat connecting surfaces extending at opposite parts of the longitudinal centreline plane of said at least one floating element.

14. Floating device according to claim 13, wherein said first curvature radius of the curvilinear surfaces is equal to the radius of the pipe of maximum diameter that can be housed within the seat defined between the floating elements.

15. Floating device according to claim 13, wherein said second curvature radius of the third curvilinear surface is equal to the radius of the pipe of minimum diameter that can be housed within the seat defined between the floating elements.

16. Floating device according to claim 1, wherein the substantially semi-tubular body of the floating elements is provided with a substantially planar outer face extending at least one of said protrusions and/or at least one of said slots.

17. Floating device according to claim 1, further comprising at least one fixing device for associating said floating elements in a removable manner.

18. Floating device according to claim 17, wherein said floating elements are each provided with at least one seat adapted to house at least one fixing device.

19. Floating device according to claim 18, wherein said seat comprises a through hole formed in the substantially semi-tubular body of said floating elements.

20. Floating device according to claim 19, wherein said floating elements are each provided with a plurality of through holes formed in the substantially semi-tubular body thereof and spaced pitchwise with respect to each other.

21. Floating device according to claim 20, further comprising a plurality of fixing devices housed in said through holes for associating said floating elements in a removable manner.

22. Floating device according to claim 1, wherein the substantially semi-tubular body of the floating elements is hollow and is optionally filled with foamed material.

23. Floating device according to claim 22, wherein the substantially semi-tubular body of the floating elements is provided with a plurality of stiffening ribs.

24. Floating device according to claim 23, wherein said stiffening ribs are formed in the substantially semi-tubular body of the floating elements at a plurality of seats adapted to house at least one fixing device for associating said floating elements in a removable manner.

25. Floating device according to claim 1, wherein the substantially semi-tubular body of the floating elements is made of plastic material.

26. Floating element comprising a substantially semi-tubular body provided with at least one seat for housing a respective fixing device for removably associating the floating element to at least one additional floating element of a floating device for pipes,
wherein said substantially semi-tubular body comprises:
(i) at least a first protrusion and at least a first slot at a first longitudinal edge thereof; and
(ii) at least a second protrusion and at least a second slot at a second opposite longitudinal edge thereof;
wherein said protrusions are substantially aligned to said slots at opposite parts with respect to a longitudinal centreline plane of the floating element; and
wherein said substantially semi-tubular body is provided with an inner wall formed by a plurality of curvilinear surfaces having a predetermined curvature radius connected by flat surfaces extending at opposite parts of said longitudinal centreline plane.

27. Floating element according to claim 26, wherein said substantially semi-tubular body comprises:
(i) one protrusion and two slots at said first longitudinal edge thereof; and
(ii) two protrusions and one slot at said second longitudinal edge thereof.

28. Floating element according to claim 27, wherein the slots formed at said first longitudinal edge are formed at longitudinally opposite parts of said protrusion and wherein the protrusions formed at said second longitudinal edge are extending at longitudinally opposite parts of said slot.

29. Floating element according to claim 26, wherein said inner wall of the body comprises:
two curvilinear surfaces having a first curvature radius and extending at opposite parts of said longitudinal centreline plane;
a third curvilinear surface having a second curvature radius lower than the first curvature radius and extending astride said longitudinal centreline plane; and
two flat connecting surfaces between said curvilinear surfaces and said third curvilinear surface, said flat connecting surfaces extending at opposite parts of said longitudinal centreline plane.

30. Floating element according to claim 29, wherein said first curvature radius of the curvilinear surfaces is equal to the radius of the pipe of maximum diameter that can be housed within a seat defined between at least two floating elements.

31. Floating element according to claim 29, wherein said second curvature radius of the third curvilinear surface is equal to the radius of the pipe of minimum diameter that can be housed within a seat defined between at least two floating elements.

32. Floating element according to claim 26, wherein said substantially semi-tubular body is hollow, is made of plastic material and is optionally filled with foamed material.

33. Floating device for pipes comprising at least two floating elements each comprising a substantially semi-tubular body, said floating elements being removably associable so as to define a pipe housing seat,
wherein the substantially semi-tubular body of the floating elements comprises:
(i) at least a first protrusion and at least a first slot at a first longitudinal edge thereof; and
(ii) at least a second protrusion and at least a second slot at a second opposite longitudinal edge thereof;
wherein said protrusions are substantially aligned with said slots at opposite parts with respect to a longitudinal centreline plane of the floating element so as to allow at least a partial interpenetration of the substantially semi-tubular bodies of the floating elements; and
wherein the substantially semi-tubular body of at least one of the floating elements is provided with an inner wall formed by a plurality of curvilinear surfaces having a predetermined curvature radius connected by flat surfaces extending at opposite parts of said longitudinal centreline plane of the floating element.

34. Floating device according to claim 33, wherein the substantially semi-tubular body of the floating elements comprises:
(i) one protrusion and two slots at said first longitudinal edge thereof; and
(ii) two protrusions and one slot at said second longitudinal edge thereof.

35. Floating device according to claim 34, wherein the slots formed at said first longitudinal edge are formed at longitudinally opposite parts of said protrusion and wherein the protrusions formed at said second longitudinal edge are extending at longitudinally opposite parts of said slot.

36. Floating device according to claim 33, wherein said floating elements have a symmetric configuration with respect to a transversal centreline plane thereof.

37. Floating device according to claim 34, wherein the protrusion extending from the first longitudinal edge of the substantially semi-tubular body has a length which is substantially twice the length of each of the two slots formed in said first edge and wherein the slot formed in the opposite longitudinal edge of said body has a length which is substantially twice the length of each of the two protrusions extending from said second edge.

38. Floating device according to claim 33, wherein said at least a first protrusion has substantially the same length of said at least a second slot and wherein said at least a second protrusion has substantially the same length of said at least a first slot.

39. Floating device according to claim 33, wherein said protrusions and said slots define respective end surfaces substantially coplanar with each other.

40. Floating device according to claim 33, wherein said protrusions are housed in a shape-mating manner within said slots.

41. Floating device according to claim 33, wherein said protrusions and said slots have a width substantially equal to the width of the opposite longitudinal edges of said substantially semi-tubular bodies.

42. Floating device according to claim 33, wherein the substantially semi-tubular body of the floating elements has a circumferential development lower than the circumferential development of a semi-tubular element having the same inner diameter.

43. Floating device according to claim 33, wherein the substantially semi-tubular body of at least one of the floating elements is provided with an inner wall defining a curvilinear surface having a curvature radius equal to the radius of the pipe of maximum diameter that can be housed within the seat defined between the floating elements.

44. Floating device according to claim 33, wherein said inner wall of the body comprises:
two curvilinear surfaces having a first curvature radius and extending at opposite parts of the longitudinal centreline plane of said at least one floating element;
a third curvilinear surface having a second curvature radius lower than the first curvature radius and extending astride the longitudinal centreline plane of said at least one floating element; and
two flat connecting surfaces between said curvilinear surfaces and said third curvilinear surface, said flat connecting surfaces extending at opposite parts of the longitudinal centreline plane of said at least one floating element.

45. Floating device according to claim 44, wherein said first curvature radius of the curvilinear surfaces is equal to the radius of the pipe of maximum diameter that can be housed within the seat defined between the floating elements.

46. Floating device according to claim 44, wherein said second curvature radius of the third curvilinear surface is equal to the radius of the pipe of minimum diameter that can be housed within the seat defined between the floating elements.

47. Floating device according to claim 33, wherein the substantially semi-tubular body of the floating elements is provided with a substantially planar outer face extending at least one of said protrusions and/or at least one of said slots.

48. Floating device according to claim 33, further comprising at least one fixing device for associating said floating elements in a removable manner.

49. Floating device according to claim 48, wherein said floating elements are each provided with at least one seat adapted to house said at least one fixing device.

50. Floating device according to claim 49, wherein said seat comprises a through hole formed in the substantially semi-tubular body of said floating elements.

51. Floating device according to claim 50, wherein said floating elements are each provided with a plurality of through holes formed in the substantially semi-tubular body thereof and spaced pitchwise with respect to each other.

52. Floating device according to claim 51, further comprising a plurality of fixing devices housed in said through holes for associating said floating elements in a removable manner.

53. Floating device according to claim 33, wherein the substantially semi-tubular body of the floating elements is hollow and is optionally filled with foamed material.

54. Floating device according to claim 33, wherein the substantially semi-tubular body of the floating elements is made of plastic material.

55. Floating device according to claim 53, wherein the substantially semi-tubular body of the floating elements is provided with a plurality of stiffening ribs.

56. Floating device according to claim 55, wherein said stiffening ribs are formed in the substantially semi-tubular body of the floating elements at a plurality of seats adapted to house at least one fixing device.

57. Floating device for pipes comprising at least two floating elements each comprising a substantially semi-tubular body, said floating elements being removably associable so as to define a pipe housing seat,
wherein the substantially semi-tubular body of the floating elements is hollow, is optionally filled with foamed material and comprises:
(i) at least a first protrusion and at least a first slot at a first longitudinal edge thereof; and
(ii) at least a second protrusion and at least a second slot at a second opposite longitudinal edge thereof;
wherein said protrusions are substantially aligned with said slots at opposite parts with respect to a longitudinal centreline plane of the floating element so as to allow at least a partial interpenetration of the substantially semi-tubular bodies of the floating elements;
wherein said floating elements are each provided with plurality of seats each adapted to house at least one fixing device;
wherein the substantially semi-tubular body of the floating elements is provided with a plurality of stiffening ribs; and
wherein the stiffening ribs are formed in the substantially semi-tubular body of the floating elements at said plurality of seats adapted to house said at least one fixing device.

58. Floating device according to claim 57, wherein the substantially semi-tubular body of the floating elements comprises:
(i) one protrusion and two slots at said first longitudinal edge thereof; and
(ii) two protrusions and one slot at said second longitudinal edge thereof.

59. Floating device according to claim 58, wherein the slots formed at said first longitudinal edge are formed at longitudinally opposite parts of said protrusion and wherein the protrusions formed at said second longitudinal edge are extending at longitudinally opposite parts of said slot.

60. Floating device according to claim 57, wherein said floating elements have a symmetric configuration with respect to a transversal centreline plane thereof.

61. Floating device according to claim 58, wherein the protrusion extending from the first longitudinal edge of the substantially semi-tubular body has a length which is substantially twice the length of each of the two slots formed in said first edge and wherein the slot formed in the opposite longitudinal edge of said body has a length which is substantially twice the length of each of the two protrusions extending from said second edge.

62. Floating device according to claim 57, wherein said at least a first protrusion has substantially the same length of said at least a second slot and wherein said at least a second protrusion has substantially the same length of said at least a first slot.

63. Floating device according to claim 57, wherein said protrusions and said slots define respective end surfaces substantially coplanar with each other.

64. Floating device according to claim 57, wherein said protrusions are housed in a shape-mating manner within said slots.

65. Floating device according to claim 57, wherein said protrusions and said slots have a width substantially equal to the width of the opposite longitudinal edges of said substantially semi-tubular bodies.

66. Floating device according to claim 57, wherein the substantially semi-tubular body of the floating elements has a circumferential development lower than the circumferential development of a semi-tubular element having the same inner diameter.

67. Floating device according to claim 57, wherein the substantially semi-tubular body of at least one of the floating elements is provided with an inner wall defining a curvilinear surface having a curvature radius equal to the radius of the pipe of maximum diameter that can be housed within the seat defined between the floating elements.

68. Floating device according to claim 57, wherein the substantially semi-tubular body of at least one of the floating elements is provided with an inner wall formed by a plurality of curvilinear surfaces having a predetermined curvature radius connected by flat surfaces extending at opposite parts of said longitudinal centreline plane of the floating element.

69. Floating device according to claim 68, wherein said inner wall of the body comprises:
two curvilinear surfaces having a first curvature radius and extending at opposite parts of the longitudinal centreline plane of said at least one floating element;
a third curvilinear surface having a second curvature radius lower than the first curvature radius and extending astride the longitudinal centreline plane of said at least one floating element; and
two flat connecting surfaces between said curvilinear surfaces and said third curvilinear surface, said flat connecting surfaces extending at opposite parts of the longitudinal centreline plane of said at least one floating element.

70. Floating device according to claim 69, wherein said first curvature radius of the curvilinear surfaces is equal to the radius of the pipe of maximum diameter that can be housed within the seat defined between the floating elements.

71. Floating device according to claim 69, wherein said second curvature radius of the third curvilinear surface is equal to the radius of the pipe of minimum diameter that can be housed within the seat defined between the floating elements.

72. Floating device according to claim 57, wherein the substantially semi-tubular body of the floating elements is provided with a substantially planar outer face extending at least one of said protrusions and/or at least one of said slots.

73. Floating device according to claim 57, wherein said at least one fixing device is configured for associating said floating elements in a removable manner.

74. Floating device according to claim 73, wherein each of said plurality of seats adapted to house said at least one fixing device comprises a through hole formed in the substantially semi-tubular body of said floating elements.

75. Floating device according to claim 74, wherein said floating elements are each provided with a plurality of through holes formed in the substantially semi-tubular body thereof and spaced pitchwise with respect to each other.

76. Floating device according to claim 75, further comprising a plurality of fixing devices each housed in said through holes for associating said floating elements in a removable manner.

77. Floating device according to claim 57, wherein the substantially semi-tubular body of the floating elements is made of plastic material.

* * * * *